(12) United States Patent
Loeser et al.

(10) Patent No.: US 8,281,723 B2
(45) Date of Patent: Oct. 9, 2012

(54) VEHICLE HAVING AN EDDY CURRENT BRAKE FOR A RAIL-BORNE TRANSPORTATION SYSTEM, AND A TRANSPORTATION SYSTEM WHICH IS OPERATED THEREWITH, IN PARTICULAR A MAGNETIC LEVITATION TRAIN

(75) Inventors: Friedrich Loeser, Riemerling (DE); Qinghua Zheng, Taufkirchen (DE)

(73) Assignee: ThyssenKrupp Transrapid GmbH, Kassel (DE)

( * ) Notice: Subject to any disclaimer, the term of this patent is extended or adjusted under 35 U.S.C. 154(b) by 261 days.

(21) Appl. No.: 12/597,093

(22) PCT Filed: Mar. 13, 2008

(86) PCT No.: PCT/DE2008/000796
§ 371 (c)(1),
(2), (4) Date: Oct. 22, 2009

(87) PCT Pub. No.: WO2008/145086
PCT Pub. Date: Dec. 4, 2008

(65) Prior Publication Data
US 2010/0132584 A1    Jun. 3, 2010

(30) Foreign Application Priority Data
Jun. 1, 2007   (DE) .......................... 10 2007 025 793

(51) Int. Cl.
*B60L 7/00*   (2006.01)
(52) U.S. Cl. ........ 104/281; 104/249; 188/161; 188/164; 188/165

(58) Field of Classification Search .................. 104/281, 104/182, 283, 286, 290, 292, 249; 188/161, 188/162, 164, 165; 335/288, 295
See application file for complete search history.

(56) References Cited

U.S. PATENT DOCUMENTS

| | | | | |
|---|---|---|---|---|
| 4,122,922 | A | * | 10/1978 | Baermann ..................... 188/267 |
| 5,053,654 | A | | 10/1991 | Augsburger et al. |
| 6,085,663 | A | * | 7/2000 | Powell et al. ................. 104/281 |
| 6,460,828 | B1 | * | 10/2002 | Gersemsky et al. .......... 254/267 |
| 7,533,616 | B2 | | 5/2009 | Hahn et al. |
| 2008/0257662 | A1 | | 10/2008 | Kunz |

FOREIGN PATENT DOCUMENTS

| | | |
|---|---|---|
| DE | 29 31 539 | 2/1981 |
| DE | 39 17 058 | 11/1990 |
| DE | 100 08 052 | 9/2001 |
| DE | 10 2004 013 994 | 10/2005 |
| DE | 10 2004 056 438 | 10/2005 |

OTHER PUBLICATIONS

Uwe Kroeger: "Principles, Development and Design of The Linear Eddy-Cuirrent Brake" Georg Siemens Verlagsbuchhandlung, Zev-Glas. Ann 109, No. 9, Sep. 1985 (With Eng. Abstract.).

* cited by examiner

*Primary Examiner* — Mark Le
(74) *Attorney, Agent, or Firm* — Michael J. Striker

(57) ABSTRACT

A vehicle for a rail-borne transportation system includes an eddy current brake that contains a large number of magnetic poles and a mechanism for activating the magnetic poles for braking. The magnetic poles are formed by movably supported permanent magnets, and the activation mechanism switches the permanent magnets from an inactive position into an active position.

14 Claims, 8 Drawing Sheets

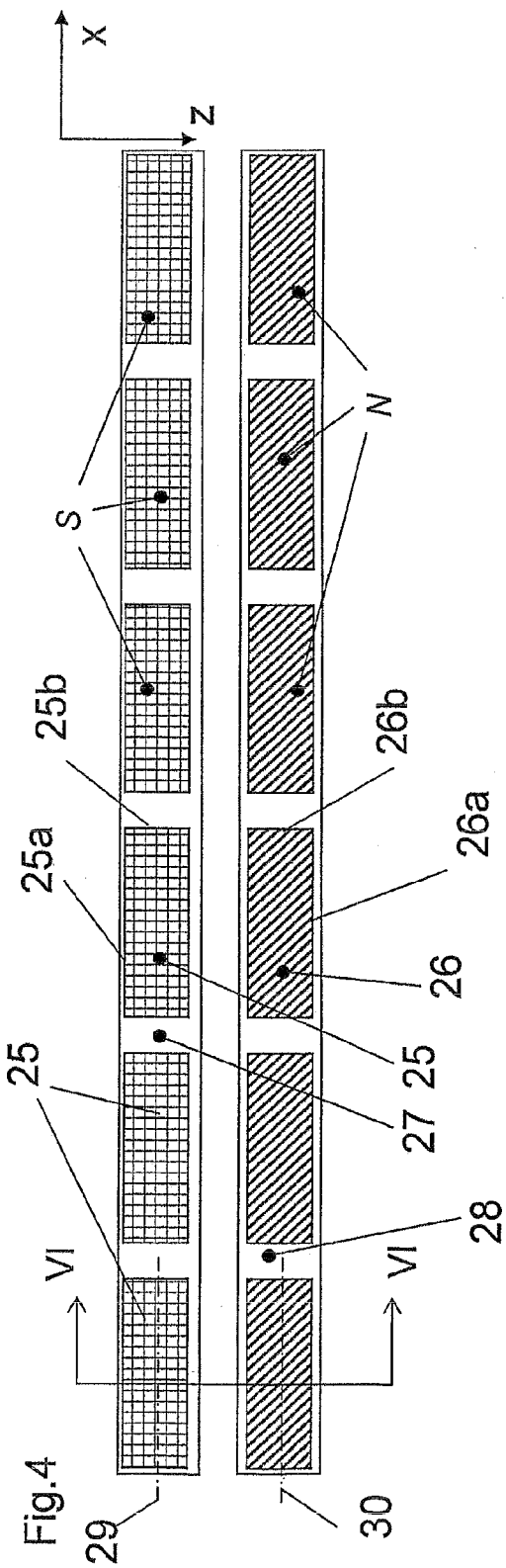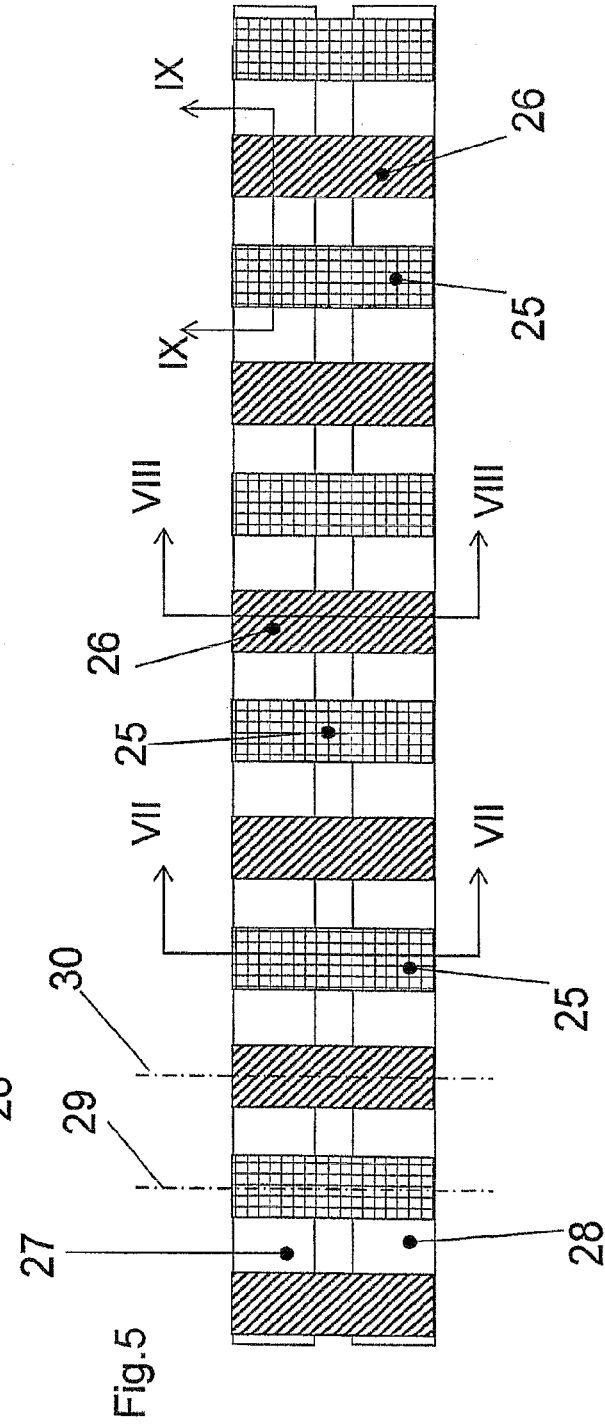

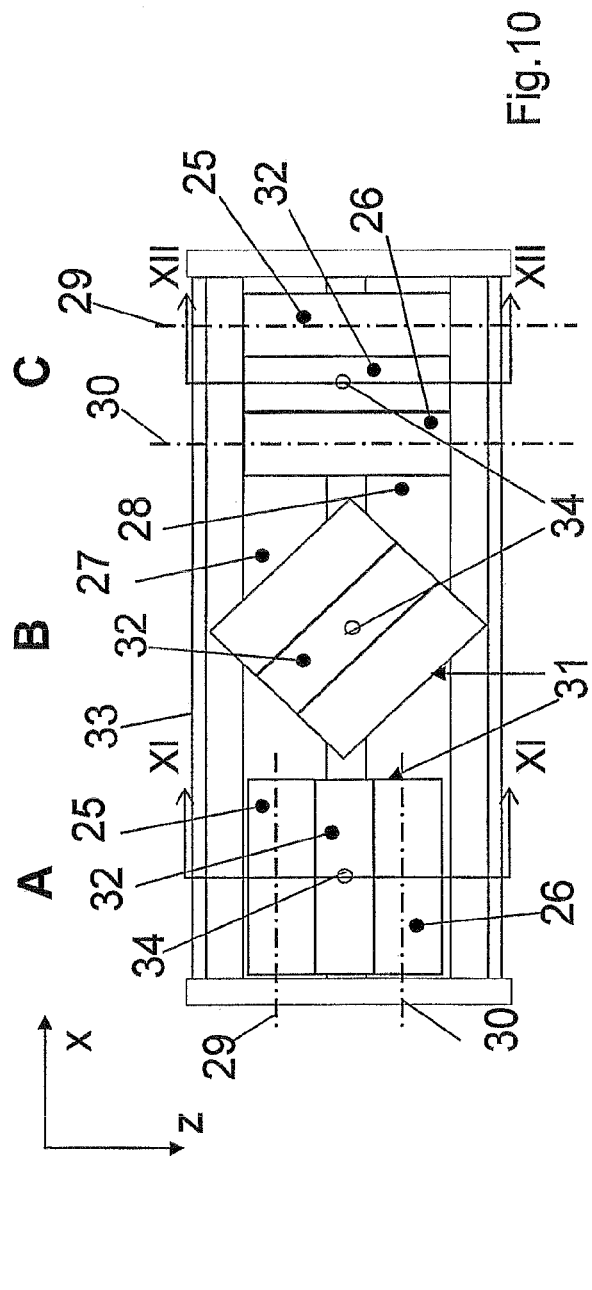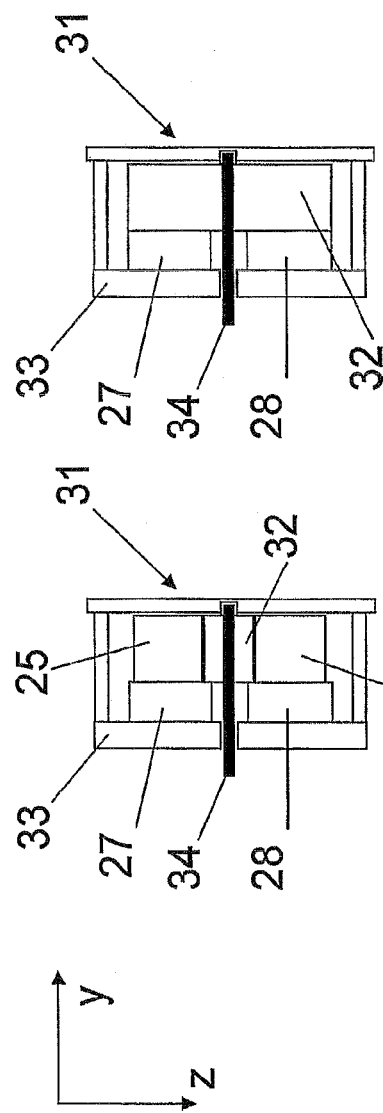

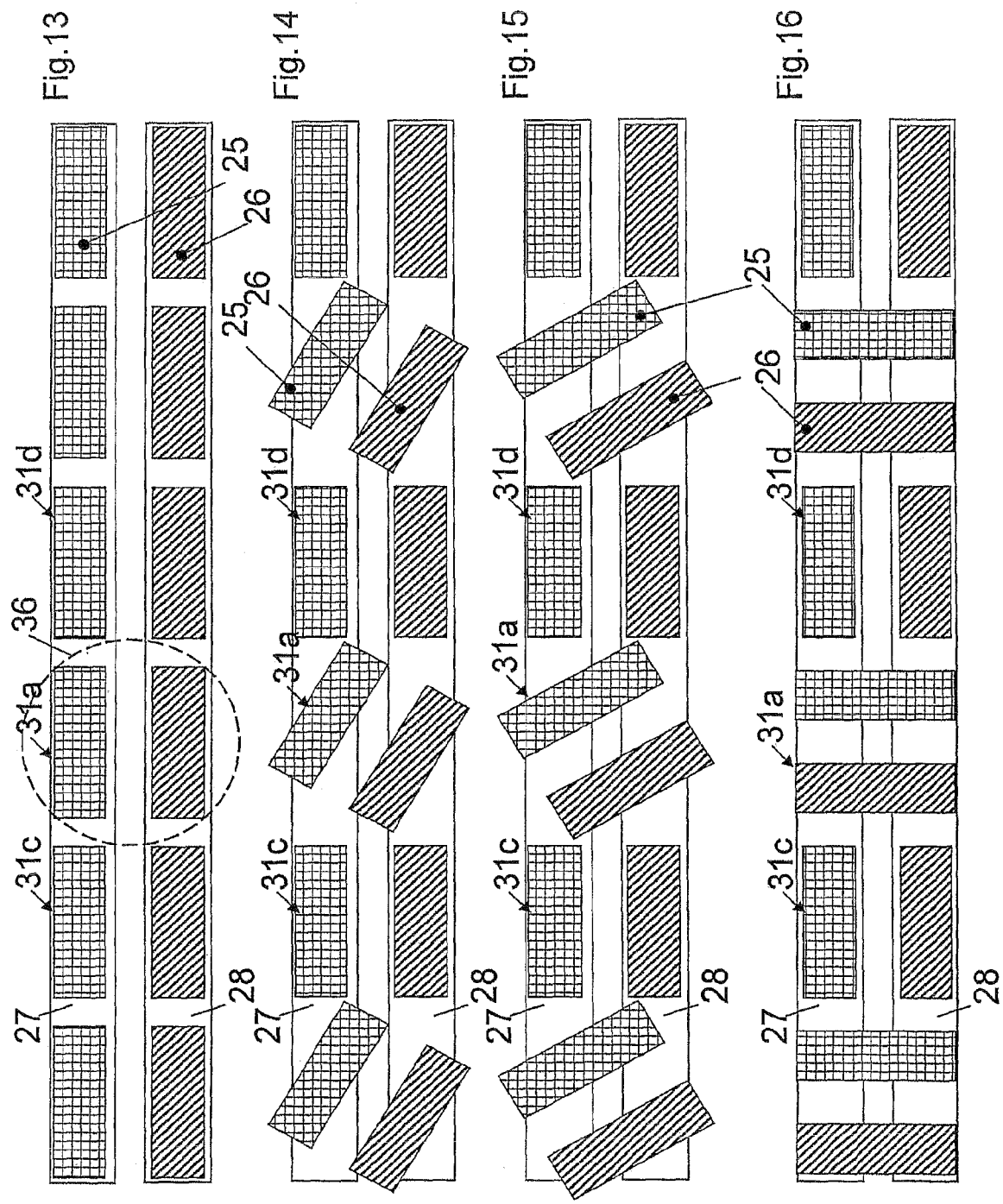

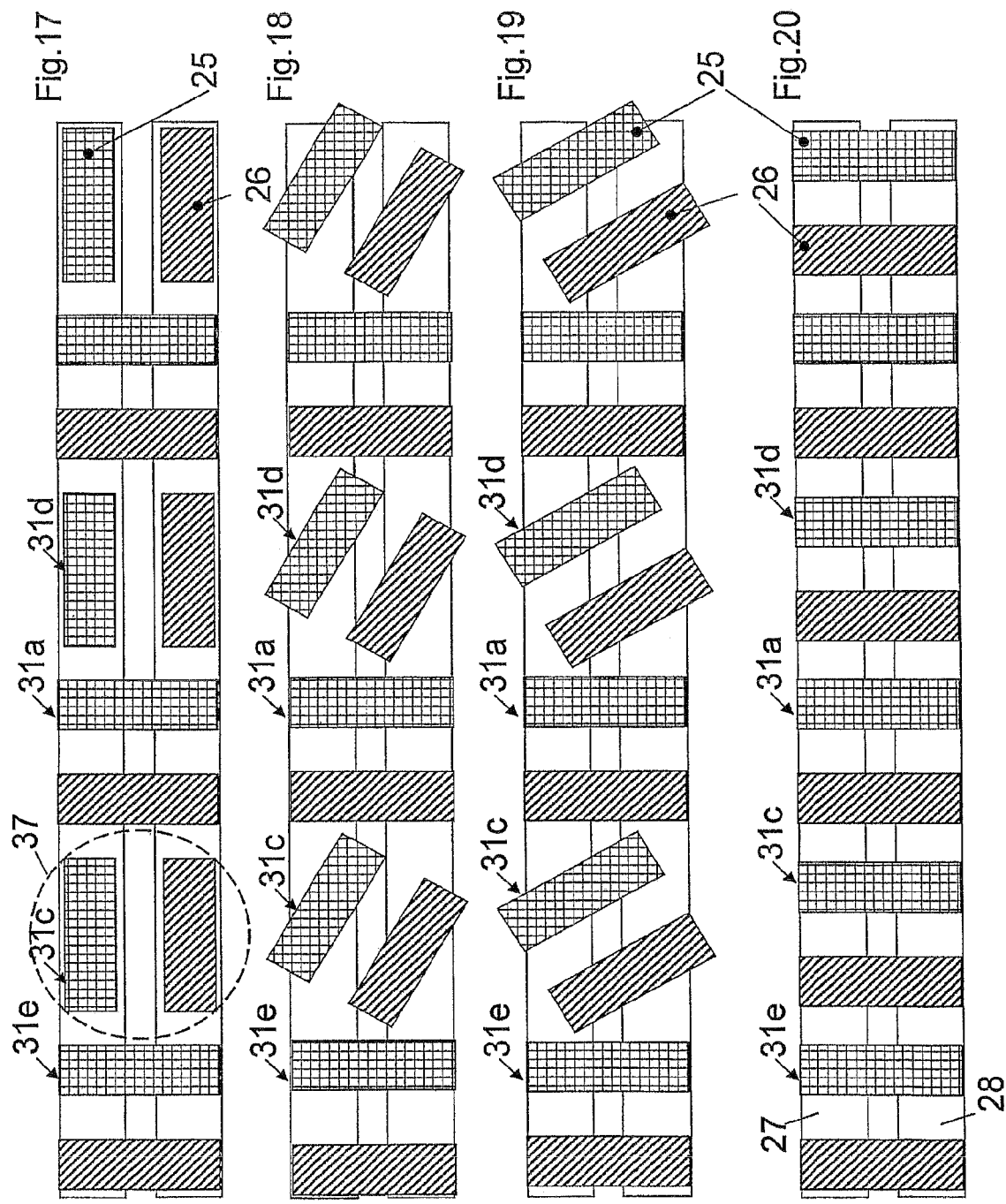

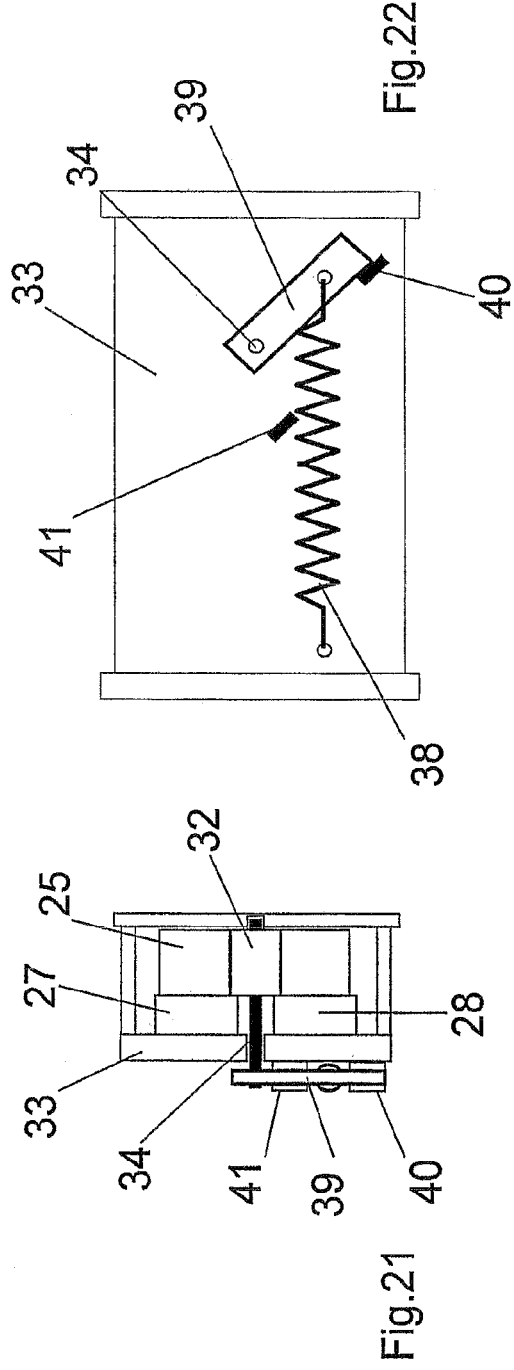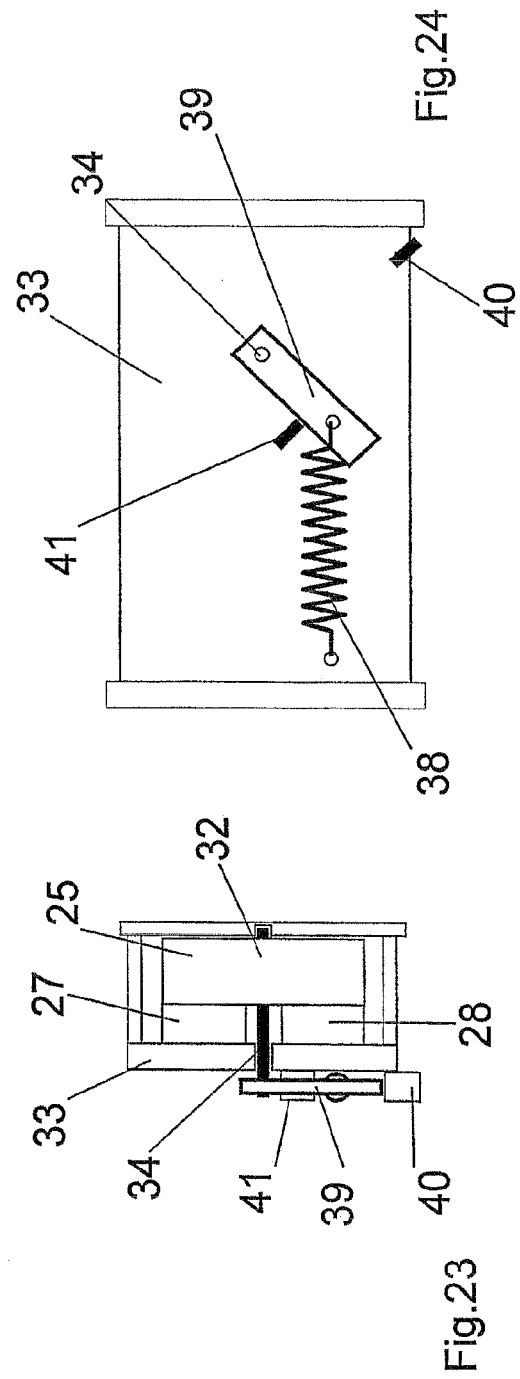

VEHICLE HAVING AN EDDY CURRENT BRAKE FOR A RAIL-BORNE TRANSPORTATION SYSTEM, AND A TRANSPORTATION SYSTEM WHICH IS OPERATED THEREWITH, IN PARTICULAR A MAGNETIC LEVITATION TRAIN

BACKGROUND OF THE INVENTION

The present invention relates to a vehicle for a rail-borne transportation system and to a rail-borne transportation system, particularly in the form of a magnetic levitation railway, which is operated using the a vehicle.

Particularly in the case of a magnetic levitation railway, vehicles of this type are driven, e.g., by elongated stator-linear motors, and, in order to drive the vehicles, they include certain three-phase alternating current windings placed in an elongated stator along the track system. The excitation field of the linear motors is delivered by supporting magnets which simultaneously function as excitation magnets and are located in the vehicle, and which form a first magnet system (e.g., DE 39 17 058 C2). The linear motors may be used for driving and for braking the vehicles.

In addition, the vehicles of the type described initially each include a second magnet system, preferably on both sides, which is used for "guidance", and which includes a plurality of magnetic poles located one after the other in the direction of travel, and windings assigned thereto (e.g., DE 10 2004 056 438 A1). They are operated using current in such a manner that all of the magnetic poles situated in a row or plane parallel to the direction of travel have the same polarity or orientation. In addition, these magnet systems are controlled using closed-control loops and assigned gap sensors such that a gap, which is referred to as a guide gap, between the magnetic poles, and ferromagnetic lateral guide rails installed on either side of the track system are always maintained at the same values.

Since braking cannot be carried out, e.g., if any or all of the support and excitation magnets or the drive system fail, magnetic levitation trains designed for use at high speeds are also equipped with a "safety" brake which is preferably composed of an eddy current brake (DE 10 2004 013 994 A1). An eddy current brake of this type is formed by a third magnet system which is located between the magnet systems to perform a "guidance" function. This third magnet system interacts with an electrically conductive reaction rail, preferably with the lateral guide rail, and includes a plurality of magnetic poles situated one after the other in the direction of travel, which, in contrast to the magnetic poles in the guide magnet system, are operated using different polarities, preferably using north and south poles in an alternating manner. As a result, when braking is activated, eddy currents are produced in the reaction rail; the eddy currents brake the magnetic levitation vehicle heavily or gently depending on the speed of the magnetic levitation vehicle and the magnitude of the direct current which is directed through the windings of the brake magnet system.

Due to the design, described above, of typical eddy current brakes, their electromagnetic poles must be activated for braking by switching on relatively high electrical currents (e.g., 80 A direct current). It is therefore necessary to equip the magnetic levitation vehicles with electrical energy accumulators having large storage capacities, which are designed as batteries and are used only in an emergency situation. This is uneconomical, results in a considerable increase in the total weight and amount of space required, and is undesired since it requires continual maintenance.

Eddy current brakes of this type may also be provided for other rail-borne transportation systems. In the case of a wheel/rail system, the vehicles could be equipped, e.g., with eddy current brakes that interact with conventional rails which would therefore function simultaneously as driving rails and reaction rails in this case.

SUMMARY OF THE INVENTION

Proceeding therefrom, the present invention is based on the technical problem of designing the vehicle of the type described initially and the transportation system operated therewith in such a manner that only a minimum of electrical energy is required to activate the eddy current brake.

Due to the use, according to the present invention, of permanent magnets, it is only necessary to move the permanent magnets from an inactive position into an active position in order to activate the eddy current brake for brake activation. The energy required for this is minimal, and it may be further reduced, e.g., by moving the permanent magnets using preloaded springs which are kept loaded during normal operation using a locking mechanism, and which are released via an unlocking procedure for brake activation.

Further advantageous features of the present invention result from the dependent claims.

BRIEF DESCRIPTION OF THE DRAWINGS

The present invention is explained below in greater detail with reference to the attached drawings of an exemplary embodiment.

FIGS. 4 and 5 are schematic illustrations of the position of permanent magnets of the eddy current brake according to the present invention, in an inactive position, and in an active position;

FIG. 10 shows a sectional view of several magnetic pole units, each of which contains two permanent magnets, of the eddy current brake according to the present invention, in three different rotational positions.

FIGS. 11 and 12 show cross sections along lines XI-XI and XII-XII in FIG. 10;

FIGS. 13 through 20 show schematic depictions of the activation of an eddy current brake according to the present invention; and FIGS. 21 through 24 are schematic depictions of means for locking an individual magnetic pole unit as shown in FIGS. 10 through 12 in an inactive position, and their activation or transfer to an active position, each in a cross sectional view according to FIGS. 11 and 12, and in a rear view.

DETAILED DESCRIPTION OF THE INVENTION

Figure 1:
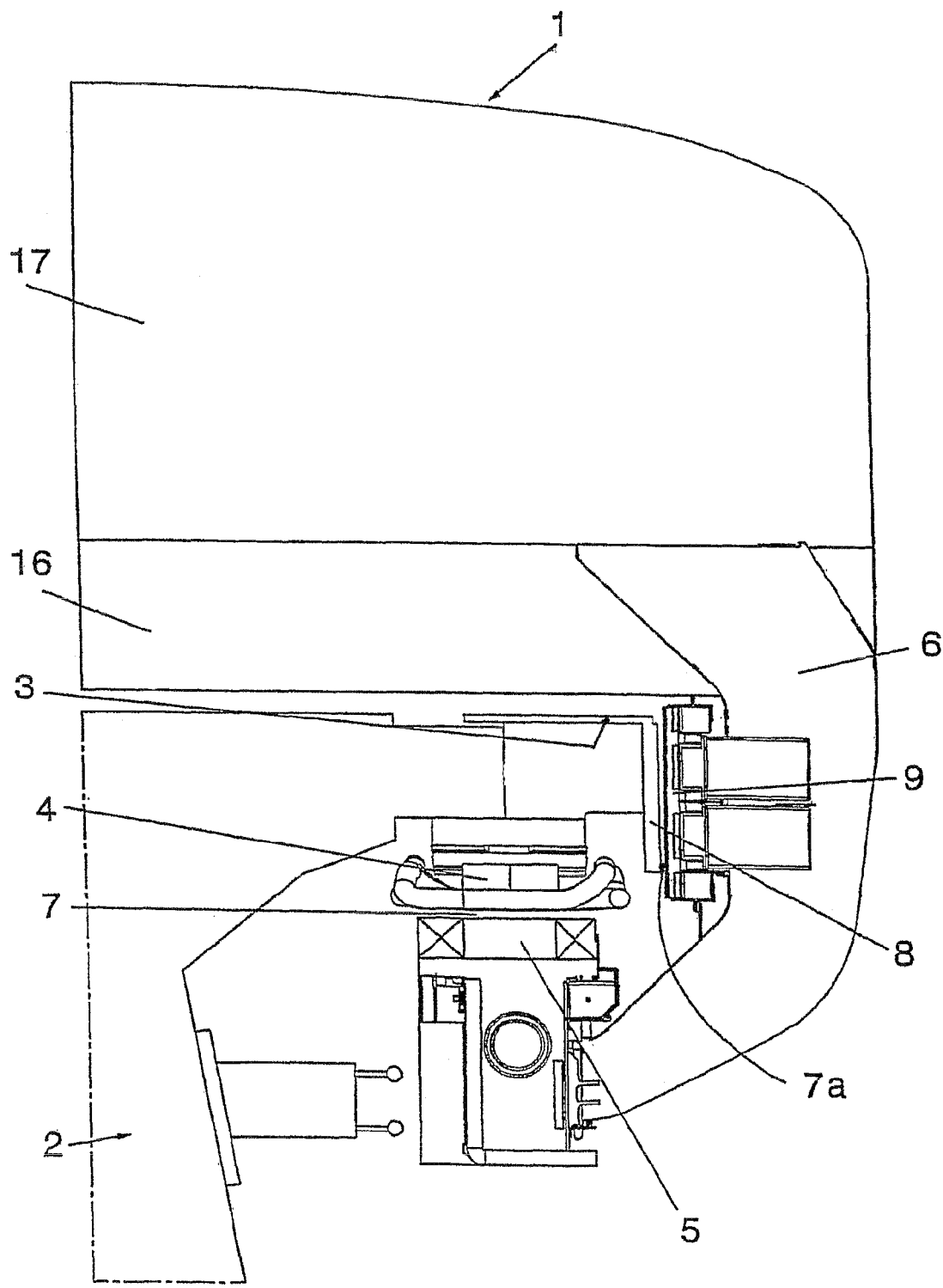
FIG. 1 shows a schematic, partial cross section of a typical magnetic levitation vehicle.

FIG. 1 is a schematic cross-sectional view of a magnetic levitation vehicle 1 which is drivably mounted on a track system in a typical manner; the track system includes supports 2 made of steel and/or concrete, and track slabs 3 mounted thereon. Magnetic levitation vehicle 1 is driven via an elongated stator motor which includes stator cores 4 installed underneath track slabs 3 and situated one behind the other in the longitudinal direction of track slabs 3. Stator cores 4 include not-shown teeth and grooves situated in alternation and into which windings are inserted; the windings are supplied with alternating current having a variable amplitude and frequency. The actual excitation field of the elongated stator motor is generated by at least one support magnet 5 which is fastened to magnetic levitation vehicle 1 using at least one lateral frame strap 6, and by magnetic poles facing grooves in stator cores 4, which are open downward in FIG. 1. Support magnet 5 provides the excitation field and performs the levitation function by maintaining a predefined gap 7 of, e.g., 10 mm between support magnets 5 and stator cores 4 during operation of magnetic levitation vehicle 1.

To guide magnetic levitation vehicle 1 on the track, track slabs 3 include reaction and lateral guide rails 8 installed on the side, which are opposite to guide magnets 9 which are also mounted on frame straps 6, and which are used to maintain a gap 7 or gap 7a between themselves and reaction rail 8 during operation. Support magnet 5 and guide magnet 9 shown in FIG. 1 each form a magnet system, which is mounted on frame straps 6, for performing the "support" and "guidance" functions. However, it is clear that a plurality of magnet systems of this type may typically be installed on magnetic levitation vehicle 1 such that they are situated next to one another and one behind the other in the direction of travel. Every magnet system is preferably connected to a magnet rear-side housing, via which it is attached to frame straps 6 which themselves are connected to a rigid undercarriage or levitation chassis 16 which includes longitudinal and transverse connectors; a carriage housing 17, which includes a passenger compartment, of magnetic levitation vehicle 1 (FIG. 1) is supported on undercarriage or levitation chassis 16.

Figure 2:
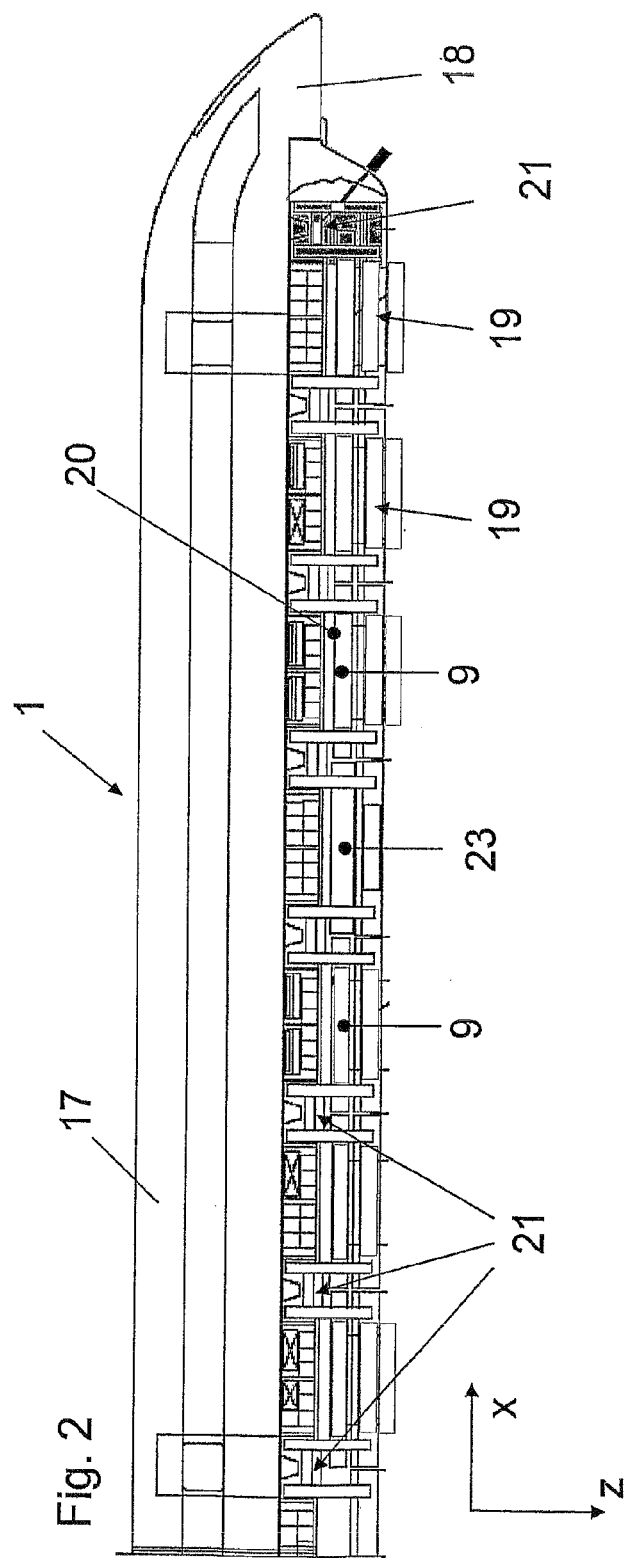
FIG. 2 shows a schematic side view of a part of the magnetic levitation vehicle in FIG. 1, which includes a known guidance and brake system.

A practical embodiment of magnetic levitation vehicle 1 in FIG. 1 is, e.g., the design shown in FIG. 2. The direction of travel of magnetic levitation vehicle 1 is indicated by coordinate x of an imagined coordinate system, and its front end is indicated by reference numeral 18. Furthermore, a few levitation chassis sections 19 of levitation chassis 16 (FIG. 1) are shown in basic schematic depictions; levitation chassis sections 19 are situated one behind the other in the longitudinal direction of vehicle 1, and they are coupled via not-shown air-spring assemblies to carriage housing 17 of magnetic levitation vehicle 1. Levitation chassis sections 19 include support elements 21, which are interspaced in the longitudinal direction, are connected via longitudinal supports 20, and are designed as frame parts on which guide magnets 9 and the magnet systems of eddy current brakes 23 are attached in a known manner. In the embodiment, an eddy current brake 23 is located between every three front and rear guide magnets 9.

Magnetic levitation vehicles and guide and brake magnet systems of the type described herein are known to a person skilled in the art from DE 10 2004 056 438 A1 and DE 10 2004 013 994 A1 which are hereby made the subject matter of the present disclosure via reference, for simplicity.

Figure 3:
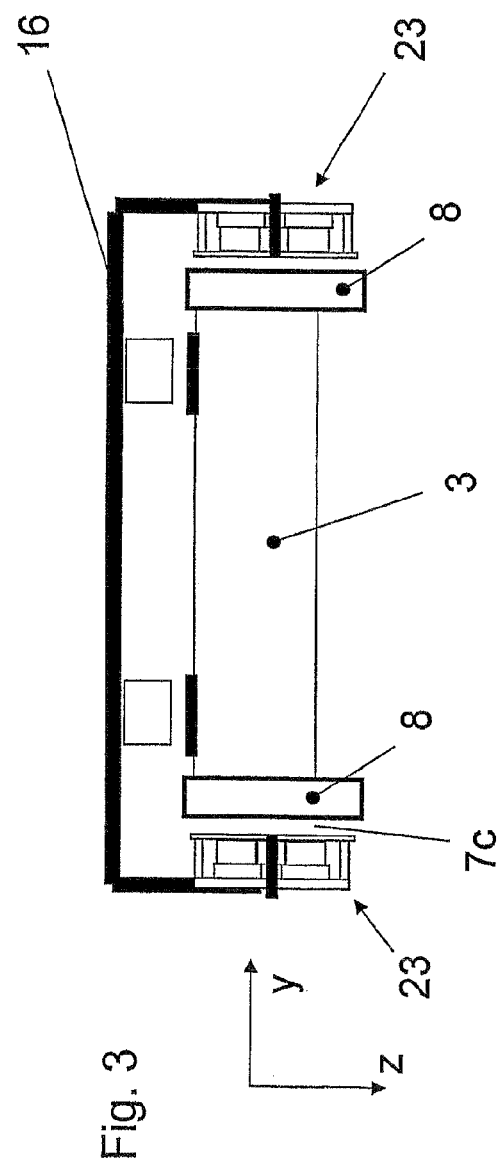
FIG. 3 is a schematic depiction of an eddy current brake according to the present invention on a magnetic levitation train depicted in FIGS. 1 and 2.

FIG. 3 is a schematic depiction of the arrangement of two eddy current brakes 23 which are located on either side of levitation chassis 16 and are opposite reaction rails 8, forming a gap 7c in each case. During normal operation, eddy current brakes 23 are located in an inactive position relative to reaction rails 8, or they are located outside of their effective region. If emergency braking is required, or if the application of eddy current brakes 23 is desired for other reasons, eddy current brakes 23 are moved—in a manner according to the present invention—into an active position relative to reaction rails 8, or they are moved into their effective region such that a preselected number and sequence of magnetic poles of one polarity or the other polarity (north or south poles) are situated in an alternating manner opposite reaction rails 8 in direction of travel x of magnetic levitation vehicle 1. As a result, eddy currents which brake magnetic levitation vehicle 1 are generated in solid reaction rails 8 which are composed of ferromagnetic material.

FIGS. 4 through 9 show a schematic depiction of an embodiment of an eddy current brake 23 according to the present invention. It contains, in two rows situated one above the other in the z direction, e.g., six permanent magnets 25 and 26 each, which are situated one behind the other in the x direction, and pole shoes or rear sides 27 and 28 of magnets, which are assigned to permanent magnets 25 and 26, are used to close magnetic circuits, and are designed, e.g., as soft iron rails. Rear sides 27, 28 of the magnets preferably extend along the entire length of an eddy current brake 23 as measured in the x direction.

As shown in FIGS. 4 and 5, and in 7 and 8 as examples, permanent magnets 25, 26 are preferably cuboid in shape and preferably have a rectangular longitudinal cross section having long sides 25a, 26a and short end faces 25b and 26b. Permanent magnets 25, 26 are also designed such that they include, on a long side, e.g., a pole surface designed as a magnetic north pole (N), and, on the opposite side, a pole surface designed as a magnetic south pole (S), and via one of these pole surfaces, they are situated opposite to rear sides 27, 28 of magnets in tight, parallel manner, or they touch them. FIG. 4 also shows an inactive position in which all permanent magnets 25, 26 are situated via their long sides 25a, 26a or via their longitudinal axes 29 and 30 parallel to the x direction, and are assigned to rear sides 27, 28 of magnets such that only magnetic north poles are opposite one magnet rear side (27 in this case), and only magnetic south poles are opposite the other magnet rear side (28 in this case). The arrangement could also be reversed, of course. The important point is that, on every rear side 27, 28 of the magnets shown in FIG. 4, only poles having the same orientation or polarity are located one behind the other in the x direction or the direction of travel.

While only permanent magnets 25, 26 of eddy current brake 23 are shown in FIGS. 4 and 5, particular associated reaction rail 8 is also depicted schematically in FIGS. 6 through 9. Accordingly, as shown in the inactive position in FIG. 6, only the pole surfaces of permanent magnets 25 designed as south pole S are assigned to reaction rail 8 in a region opposite rear side 27 of magnet, and only the pole surfaces designed as north pole N of permanent magnets 26 are assigned to reaction rail 8 in a region opposite rear side 28 of magnets. As a result, primarily only forces of attraction exist between permanent magnets 25, 26 and reaction rails 8 when magnetic levitation vehicle 1 travels along track system 2 in the x direction. If permanent magnets 25 on one side and 26 on the other side are located close behind one another, except for small gaps which are expedient for reasons to be provided below, in direction of travel x, then, given that the orientation is the same, minor eddy currents which increase the driving resistance only slightly are also generated in reaction rails 8.

Apart from this, the pole surfaces of permanent magnets 25, 26 and the surfaces of reaction rails 8 opposite to them are preferably flat in design and are situated parallel to one another.

Figure 7:
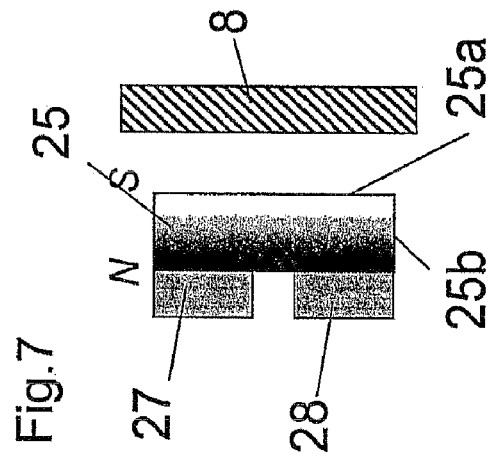
FIGS. 6 through 9 show cross sections along lines VI-VI through IX-IX in FIGS. 4 and 5.
Figure 6:
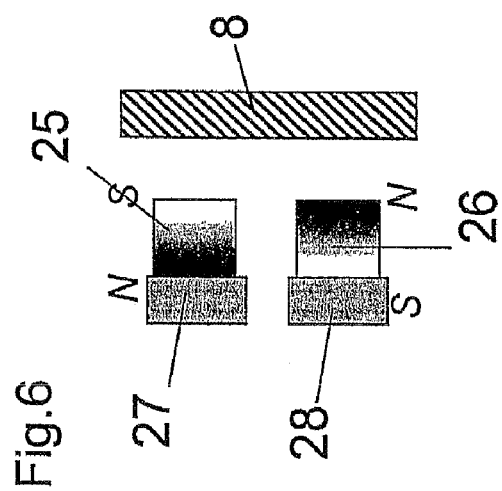
Figure 9:
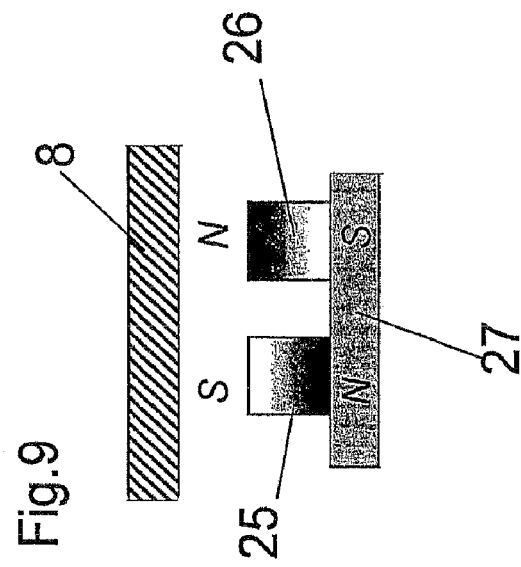
Figure 8:
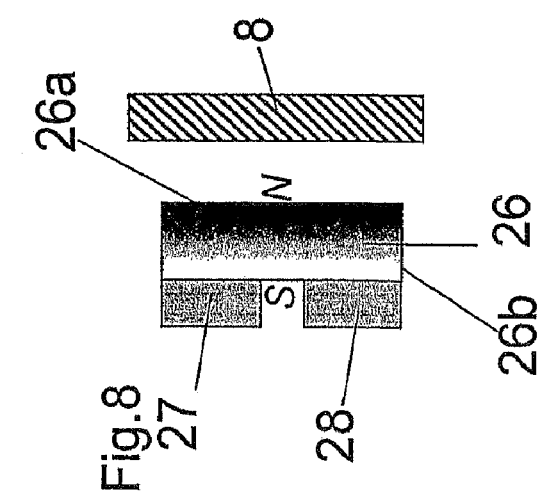

Eddy current brakes 23 are activated in the manner according to the present invention by situating permanent magnets 25, 26 shown in FIG. 5 with their longitudinal axes 29, 30 located transversely to and, in particular, perpendicular to direction of travel x. If the system as shown in FIG. 5 is designed such that north and south poles now alternate in direction of travel x, and permanent magnets 25, 26 each extend, via about half their body length, beyond one or the other rear side 27, 28 of magnets, or if they bear against them, then the simultaneous result of this, as shown in FIGS. 7 through 9 in particular, is that north and south poles are opposite reaction rail 8 in an alternating manner and in the same plane, i.e., in the plane opposite rear side 27 of magnet and in the plane opposite rear side 28 of magnet. Due to the alternating arrangement of north and south poles, and the movement of permanent magnets 25, 26 taking place in the x direction relative to reaction rails 8 which are made of solid, electrically conductive materials, magnetic alternating fields are produced, which induce corresponding electrical alternating fields, and, therefore, eddy currents, in reaction rails 8; the eddy currents attempt to inhibit the reason for their creation, i.e., the movement of magnetic poles 25 and 26, thereby braking magnetic levitation vehicle 1. The magnitude of the braking force may be selected via the magnetic field strength of the magnetic poles.

According to the present invention, eddy current brake 23 therefore has magnetic poles formed by movably supported permanent magnets 25, 26, and activation means which are designed to move permanent magnets 25, 26 out of the inactive position shown in FIG. 4 and into the active position shown in FIG. 5. In the embodiment, at least two permanent magnets 25, 26 having different orientations are also provided, the pole surfaces of which lie substantially in a common plane which is parallel to reaction rail 8; magnetic poles having different polarities are only located one above the other in the inactive position, while, in the active position, they are located in alternation, one behind the other, in the direction of travel (FIG. 5).

According to a preferred embodiment which so far has been considered to be the best, eddy current brake 23 is activated by rotating permanent magnets 25, 26, and the activation means are designed to rotate permanent magnets 25, 26. This will be explained in greater detail below with reference to FIGS. 10 through 12.

FIG. 10 shows a schematic illustration of a part of eddy current brake 23 depicted in FIGS. 4 and 5; each part of eddy current brake 23 includes three of the six permanent magnets 25, 26. In each case, a permanent magnet 25 is combined with a permanent magnet 26 to form a magnetic pole unit 31. For this purpose, permanent magnets 25, 26 are situated in pairs with their long sides parallel to one another, and they are fastened to a connecting part 32 located between them. The three magnetic pole units 31 shown in FIG. 10, and the other three similarly designed magnetic pole units 31 of eddy current brake 23 are situated, one behind the other in the x direction, in a housing 33, on the back side of which the two rear sides 27, 28 of magnets are attached, as shown in FIGS. 11 and 12. In the embodiment, housing 33 and, with it, rear sides 27, 28 of magnets are attached in a stationary manner to the not-shown magnetic levitation vehicle, and they extend along the entire length of eddy current brake 23, while connecting parts 32 of magnetic pole units 31 are rigidly fastened to axes 34 which are rotatably supported in housing 33, and, together therewith, are rotatably supported in housing 33. The rotational axes of axles 34 are situated parallel to the y axis of the imagined coordinate system, while the magnetic pole surfaces of permanent magnets 25, 26 shown in FIGS. 11 and 12 facing rear sides 27, 28 of magnets on one side and reaction rails 8 on the other side preferably lie parallel to the xy planes of this coordinate system; this also applies for the assigned surfaces of rear sides 27, 28 of magnets, and reaction rails 8 which are not shown in FIGS. 10 through 12.

In an inactive position A (FIG. 10), permanent magnet 25 of one of the magnetic pole units 31 is situated with its longitudinal axis 29 parallel to rear side 27 of magnet, and permanent magnet 26 with its longitudinal axis 30 parallel to rear side 28 of magnet, as also shown in FIG. 4. If magnetic pole unit 31 is rotated about its axis 34 by approximately 45°, position B shown in FIG. 10 is attained, in which both permanent magnets 25, 26 are partially opposite rear side 27 of magnet and rear side 28 of magnet. After a rotation of 90° relative to position A, a magnetic pole unit 31 finally attains a position C in which approximately half of permanent magnet 25 and permanent magnet 26 are opposite rear side 27 of magnet and rear side 28 of magnet. Similar to the depiction in FIG. 5, longitudinal axes 29, 30 of permanent magnets 25, 26 are now situated substantially parallel to the z axis, with the result that a magnetic pole having a certain orientation (e.g., the S pole of permanent magnet 25) in the x direction is followed, on the side of reaction rail 8, by a magnetic pole having the other orientation (e.g., the N pole of permanent magnet 26). Merely by rotating magnetic pole units 31, it is therefore possible to move eddy current brake 23 out of its inactive state (FIGS. 4 and 11) and into its active state (FIGS. 5 and 12).

The rotation of permanent magnets 25, 26 described herein has numerous advantages. First, it may be carried out using a relatively small amount of electrical energy. In addition, the braking force may be adjusted in a highly flexible manner by changing the number of magnetic pole units 31 to be rotated into the active position, as needed. When six magnetic pole units 31 are present, six different brake levels are possible in particular.

FIGS. 13 through 20 show, as an example, the course of an activation of above-described eddy current brake 23. Starting in the inactive position shown in FIG. 13, according to FIG. 4, the first, third, and fifth magnetic pole unit 31 is rotated first, until the full active position shown in FIG. 16 has been attained via the intermediate positions shown in FIGS. 14 and 15. If this position, which corresponds to approximately half of the installed brake force, is sufficient for the desired extent of braking, the position shown in FIG. 16 is maintained. However, if full braking is desired, then—starting from the position shown in FIG. 16 and FIG. 17—the second, fourth, and sixth magnetic pole unit 31 is rotated via the intermediate positions shown in FIGS. 18 and 19 into the active position shown in FIG. 20, in which eddy current brake 23 is fully effective.

Via the sequential rotation of magnetic pole units 31 as shown in FIGS. 13 through 20, the advantage is attained, for instance, that magnetic pole units 31 may be located very closely to one another in their inactive position. As indicated via enclosing circles 36 and 37 in FIGS. 13 and 17, each magnetic pole unit (e.g., 31a, 31c) is situated such that, when rotated, they will not collide with adjacent magnetic pole units (e.g., 31c, 31d, or 31e, 31a) if these adjacent magnetic pole units are held stationary. The closest possible position of magnetic pole units 31 in their inactive position is indicated by enclosing circle 36, 37; a smaller clearance is therefore possible in the x direction that if all magnetic pole units 31 would have to be rotated at the same time.

Aside from FIGS. 13 through 20, it is also possible, of course, to successively rotate into the active position only groups of two magnetic pole units 31 each, or selected individual magnetic pole units 31 out of the six that are present.

If magnetic pole units 31 should be rotated using even less electrical energy, e.g., as would be the case if electric motors were used, then it is also provided according to the present invention to use preloaded springs 38 (FIGS. 21 through 24) to facilitate rotation. As a result, only that energy need be expended for brake activation that is required to release the spring force.

According to FIG. 21, which shows a magnetic pole unit 31 according to FIG. 11, a swiveling lever 39 is fixedly connected to axle 34 and projects radially away from axle 34; swiveling lever 39 is located, e.g., on the outside of a rearward part of housing 33. One end of spring 38 is fixedly connected to swiveling lever 39 at a certain distance from axle 34, and another end of spring 38 is fixedly connected to housing 33. Furthermore, the system is designed such that, when magnetic pole unit 31 (FIGS. 21, 22) is in the inactive position, spring 38 is preloaded, and a locking pin 40 which is movably supported in or on housing 33 reaches behind swiveling lever 39 and prevents it from swiveling. However, if the active position of magnetic pole unit 31 should be attained (FIGS. 23, 24), locking pin 40 is retracted using not-shown means into a position shown in FIG. 24. As a result, swiveling lever 39 is released and is swiveled via the force of spring 38. Axle 34 is rotated together with swiveling lever 39, which, as described above, causes magnetic pole unit 31 to swivel into the active position. The active position is preferably established via a stop 41 which limits the swivel travel of swiveling lever 39. The configuration is selected, in particular, such that, when swiveling lever 39 bears against stop 41, associated magnetic pole unit 31 automatically assumes the correct position, which is shown, e.g., in FIGS. 5 and 23, relative to reaction rail 8 or rear sides 27, 28 of magnets that are affected, i.e., the effective magnetic pole surfaces in particular are located opposite reaction rail 8 and parallel thereto with the necessary clearance.

Locking pin 40 and its release means form a locking mechanism which normally locks permanent magnets 25, 26 in their position which is preloaded by springs 38. Unlocking, which is required for brake activation, and which is carried out by retracting locking pin 40, may be implemented, e.g., using electrical, electromagnetic, pneumatic, hydraulic, or mechanical means which could also be actuated manually if necessary.

The present invention is not limited to the embodiment described, and it may be modified in various manners. This applies in particular for the number and design of permanent magnets which are provided for each eddy current brake 23 in the specific case. Furthermore, other activation means other than those described here may be provided. It is possible, in particular, to move permanent magnets 25, 26 via their linear motion, e.g., in the z direction, into the effective region of reaction rail 8 and into the gap between this and rear sides 27, 28 of magnets. In this case, a brake activation that takes place in two stages could be induced, in a first step, by moving a first row of permanent magnets into the effective region of the reaction rail, and, in a second step, by also moving a second row of permanent magnets into the effective region of the reaction rail. Furthermore, every magnetic pole unit 31 basically only needs to include one permanent magnet which, in FIG. 5, is assigned, e.g., to only the top or bottom rear side 27, 28 of magnets. However, to induce a high maximum brake force, a system of the type shown in FIGS. 4 and 5 is advantageous; this system includes at least two rows of magnetic poles having alternating polarities, and which are located one above the other transversely to the direction of travel, i.e., in the z direction. Apart therefrom, reaction rails 8 could be assigned to eddy current brakes 23 other than those that are also used for the guidance function; these other reaction rails could also include effective surfaces that are parallel to the xy planes. In this case, eddy current brakes 23 would be installed in a position that was rotated accordingly. Furthermore, it is clear that the locking mechanism shown in FIGS. 21 through 24 could be replaced with numerous other advantageous locking mechanisms, and that non-shown means are provided for returning magnetic pole units 31, after braking has been carried out, to the inactive position shown in FIG. 22, under the load of springs 38. Furthermore, in deviation from FIG. 10, it is possible to locate every magnetic pole unit 31 in a separate housing 33, as indicated in FIGS. 22 and 24. It should also be pointed out that the present invention also includes a rail-borne transportation system which is equipped with vehicle 1 described herein, and which is composed of a combination of at least one eddy current brake 23 installed on vehicle 1, and at least one reaction rail 8 installed on track system 2, such that eddy current brake 23 is located outside of the effective region when in an inactive state, and, when in an active state, is located within the effective region of an assigned reaction rail 8. In the case of a conventional wheel/rail system, the eddy current brakes could be installed, e.g., underneath the vehicles and, for brake activation, they could be moved into an active position such that they interact with the guide rails, which are now also functioning as reaction rails. Finally, it is understood that the various features described may also be used in combinations other than those described and depicted herein.

What is claimed is:

1. A vehicle for a rail-borne transportation system, comprising
   an eddy current brake (23) which contains a large number of magnetic poles formed by rotatably supported permanent magnets (25, 26), and
   means for rotating the permanent magnets (25, 26) from an inactive position into an active position for braking,
   wherein at least two of the permanent magnets (25, 26) of the eddy current brake (23) comprise pole surfaces that have different polarities, which pole surfaces are situated in a common plane regardless of alignment of the permanent magnets (25, 26) in the inactive position or the active position, and which, in the active position, are located one behind the other in a direction of travel, and which, in the inactive position, are located one above the other transversely to the direction of travel.

2. The vehicle as recited in claim 1, wherein the means for rotating switch the permanent magnets (25, 26) from the inactive position into the active position.

3. The vehicle as recited in claim 1, wherein the permanent magnets (25, 26) are situated such that, in the inactive position, all magnetic poles of one polarity are located one behind the other in one row, and all of the magnetic poles of the other polarity are located one behind an other row, and wherein the means for rotating are designed such that, for brake activation, the permanent magnets (25, 26) are movable in a manner such that, in at least the one and the other row, magnetic poles, which are selected in alternation, of one polarity and the other polarity are located one behind the other in alternation.

4. The vehicle as recited in claim 1, wherein the permanent magnets (25, 26) are combined to form magnetic pole units (31), each of which includes two parallel permanent magnets (25, 26) which are fixedly connected to one another via an intermediate connecting part (32), and wherein the magnetic pole units (31) are rotatably supported via axles (34) which are fastened to the connecting parts (32).

5. The vehicle as recited in claim 4, wherein the means for rotating is designed to selectively rotate the magnetic pole units (31) individually.

6. The vehicle as recited in claim 5, wherein the means for rotating is designed to rotate the magnetic pole units (31) individually or in groups, one after the other.

7. The vehicle as recited in claim 4, wherein the means for rotating include at least one preloaded spring (38), wherein the permanent magnets (25, 26) or magnetic pole units (31), when in their inactive position, are under an influence of the at least one preloaded spring (38) and wherein the at least one preloaded spring (38) activated when braking is activated, in order to move the permanent magnets (25, 26) or magnetic pole units (31) into the active position.

8. The vehicle as recited in claim 7, wherein the means for rotating includes a locking mechanism which locks the spring (38) in the inactive position of the permanent magnets (25, 26) or magnetic pole units (31) in their preloaded position, and releases the permanent magnets (25, 26) or magnetic pole units (31) when braking is activated.

9. The vehicle as recited in claim 8, wherein the locking mechanism includes a locking pin (40) which may be placed against the permanent magnets (25, 26) or magnetic pole unit (31).

10. The vehicle as recited in claim 8, wherein a locking mechanism which may be actuated mechanically, electrically, and/or electromagnetically is provided.

11. The vehicle as recited in claim 7, wherein a stop (41) which is fixed in the active position is assigned to the permanent magnets (25, 26) or magnetic pole units (31).

12. The vehicle as recited in claim 1, wherein the permanent magnets (25, 26) or magnetic pole units (31) are located in a common housing (33).

13. The vehicle as recited in claim 1, wherein two magnet rear sides (27, 28) which are situated parallel to the direction of travel and are designed to close magnetic circuits are assigned to the permanent magnets (25, 26) or magnetic pole units (31).

14. A rail-borne transportation system, comprising:
   a track system (2) which includes at least one reaction rail (8), and
   a vehicle (1) which includes an eddy current brake (23) as recited in claim 1, which eddy current brake (23) is situated on the track system (2) in a drivable manner and parallel to the reaction rail (8);
   wherein the magnetic poles of the eddy current brake (23) interact with the reaction rail (8).

* * * * *